Patented Feb. 9, 1954

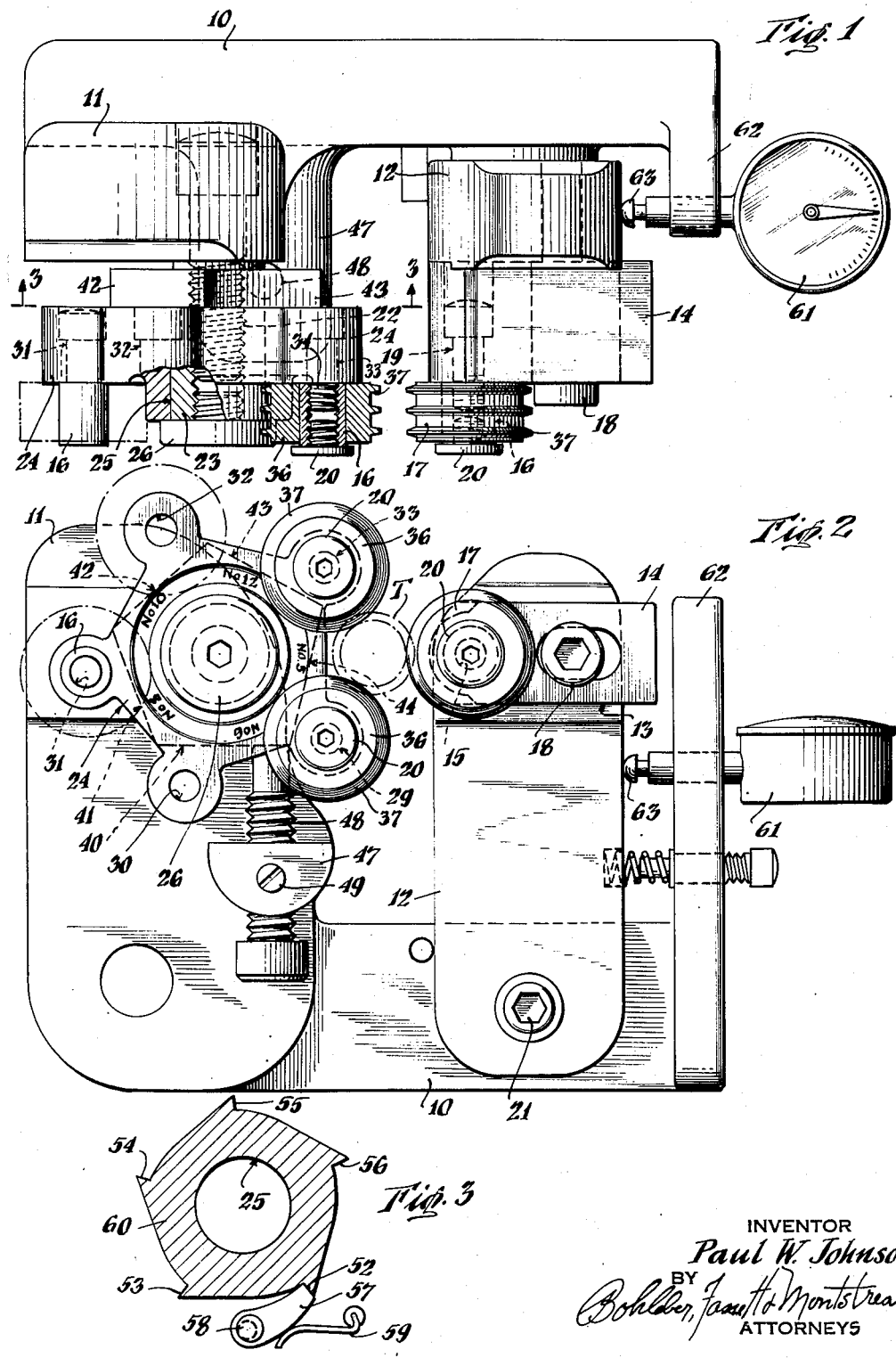

2,668,362

UNITED STATES PATENT OFFICE 2,668,362

MULTIPLE ROLLER HEAD AND GAUGE

Paul W. Johnson, Bloomfield, Conn., assignor, by mesne assignments, to The Johnson Gage Development Company, a corporation of Connecticut Application January 30, 1951, Serial No. 208,621

12 Claims. (Cl. 33—178)

1

The invention relates to a multiple roller gaging head or cradle for the type of gage utilizing a member carrying a pair of gaging rollers spaced from each other which member is mounted for pivotal movement to swing the pair of gaging rollers into open and gaging position towards and away from a cooperating gaging roller means which usually will include a single gaging roller. The invention also relates to a gage including the aforesaid multiple roller cradle or head. Heretofore a gage of this type comprised a frame or head carrying a single pair of spaced rollers or with mounting provision for a single pair of gaging rollers.

The gage has application for testing cylindrical parts of all kinds; however it finds its greatest usefulness for gaging threaded parts. In order to gage a threaded test part of a different pitch and/or diameter with a gage carrying a single pair of gaging rollers, it is necessary to replace the rollers of different pitch and diameter and/or replacement of the pivotal frame or head carrying the spaced gaging rollers. The multiple gage head or cradle herein provided with three or more bearings for gaging rollers accommodates for three or more pairs or sets of gaging rollers. With mounting means being provided for five gaging rollers the gaging of ten standard threads may be accomplished by the multiple head and by a proper combination of rolls, a total of thirty different pitch and diameter combinations can be secured.

It is an object of the invention to construct a multiple roller gaging head or cradle which can be accommodated to gage a large number of different sizes of cylindrical parts and a large number of different sizes and/or pitches of screw threads.

Another object is to construct a gage which can be set up to gage a large number of different diameters and/or pitches of screw threads merely by replacement of one or two gaging rollers.

A still further object is to construct a gage provided with a multiple gaging roller head as aforesaid.

Other objects of the invention will be more apparent from the following description when taken in connection with the accompanying drawings illustrating a preferred embodiment thereof in which:

Figure 1 is a top view of the gage for gaging screw threads with a section through a gaging roller and a section through a portion of the head;

2

Figure 2 is a side view of the gage of Figure 1; and

Figure 3 is a side view of a modified form of stop means for the multiple gaging roller head.

The multiple roller cradle or head particularly illustrated is provided with five holes to receive screws for securing five gaging roller studs thereto. With six pairs of rollers for the head, it will accommodate this head and a gage carrying the same for the following threads:

| National Coarse | National Fine |
|---|---|
| No. 5-40 NC | No. 5-44 NF |
| No. 6-32 NC | No. 6-40 NF |
| No. 8-32 NC | No. 8-36 NF |
| No. 10-24 NC | No. 10-32 NF |
| No. 12-24 NC | No. 12-28 NF |

A third roller is required for each pair for the cooperating gaging means.

It will be observed that one set of rollers will accommodate for Nos. 10 and 12 of the National Coarse (NC) thread; a second set will accommodate the National Fine (NF) No. 12; a third set will accommodate Nos. 6 and 8 of the National Coarse and No. 10 of the National Fine; a fourth set will accommodate No. 8 of the National Fine; a fifth set will accommodate No. 5 of the National Coarse and No. 6 of the National Fine; and a sixth set will accommodate No. 5 of the National Fine thread. Ordinarily to construct a gage having a separate pivotal gaging segment or frame there must be provided six separate frames, each with a pivot bearing and each with a pair of roller stud holes making a total of six pivot bearings and twelve roller stud holes for six sets of gaging rollers. The multiple roller head of the invention requires merely one pivot bearing and five roller stud holes thereby substantially reducing the work or manufacture entailed in providing and accurately grinding these bearings with the result that a gage is produced for ten different diameters and/or threads at a substantial reduction in the cost of providing gaging equipment for each size and pitch of thread.

Similarly by providing a head with six gage roller stud holes a gage is provided which will accommodate an increased number of different diameters and/or pitches of screw threads such as from ¼ inch to $\frac{9}{16}$ of an inch differing by $\frac{1}{16}$ of an inch in diameter. A head providing seven differently spaced holes will provide for a greater number of sizes and/or pitch variations.

It will be noted too that a substantial saving in set up time is secured since the roller between Nos. 6 and 8 positions or mounted upon hole 30 need not be changed since these are both 32 pitch and likewise the roller carried by hole 32 need not be changed since Nos. 10 and 12 are of the same pitch, that is, 24 NC. Similarly position No. 5 may be set up and Nos. 8 or 10 may be set up without disturbing the gaging rollers on No. 5 position so long as there are no threads to be tested and no occasion to set up for the other positions.

The gage includes a frame 10 of any desired form that shown being generally a U-shaped construction having a post 11 forming one leg of the U-shaped frame and post 12 forming the second leg spaced therefrom. The post 12 carries a guide shown as a groove 13 in which is carried a slider 14. The slider carries a cooperating gaging roller means which usually provides for a single gaging roller. Any desired mounting means for the gaging roller may be used; that shown includes a stud or mounting hole 15 in the slider which hole receives a screw 19 to clamp a gaging roller bearing or stud 16 upon which is rotatably mounted a gaging roller 17. A clamping screw 18 retains the slide and gaging roller in adjusted position. A headed screw 20 retains the gaging roller upon the stud. For an indicator type of gage as illustrated the post 12 is pivotally mounted upon the frame 10 by means of a suitable pivot means 21. The studs 16 may be of the eccentric type for adjustment.

The frame post 11 carries any suitable means for mounting the multiple roller head thereupon that shown being a screw hole which receives a screw 22 for securing a head stud 23 to the frame and upon this stud is mounted a multiple roller head 24. The head stud 23 may be eccentric but with the adjustment provided by the slider 14 this is unnecessary. The roller head has a bearing 25 to receive the stud. A screw 26 threaded into the stud and having a screw head larger than the stud retains the head thereupon.

The multiple roller head has a plurality of spaced stud or mounting holes 29, 30, 31, 32 and 33 the centers or axes of which are on one circumference or circle but are spaced apart different distances; the center or axis of the circle is the center of the stud 23. For the threads listed above, in position No. 5, the holes 29 and 33 are spaced apart .576 of an inch, for position No. 6 the holes 29 and 30 are spaced apart .587 of an inch, for position No. 8 .60 of an inch, and for position No. 10 .632 of an inch, and for position No. 12 are spaced apart .655 of an inch. This spacing is determined by the sum of the radii at the pitch line or circle of the gaging roll 17 and the test part T, multiplied by the square root of 3. With this spacing or approximate spacing the two gaging rollers of the pair engage the test part on the periphery thereof spaced closely to 120° apart. This spacing is not essential and there may be considerable variation in the spacing. However with a three roll gage it is desirable to have each roller engage the periphery of the test part at approximately 120° apart since amongst other things it provides a better test for eccentricity, diameter and staggered thread. The angular spacing is determined by 360° divided by the number of rollers. With the spacing between the centers of the gaging rollers or roller studs or screw holes bearings determined, the circle or radius thereof upon which they are to be located can be calculated.

Although in the illustrated construction of multiple roller head there are shown five roller stud or mounting holes, it is clear that the head may have provision for three or more holes or gaging roller mounting means spaced from each other and gaging rollers carried thereby. Each hole receives any form of roller mounting means, the form illustrated including a screw 34 which secures a roller stud 16 to the head and upon each stud is mounted a gaging roller 36, the gaging rollers having gaging ribs 37 or V's thereon of the proper pitch for the thread on the test part. The gaging rollers 17 and 36 are identical as to pitch and diameter and when allowed sufficient axial movement may be and are identical in all respects. For gaging plain cylindrical or conical surfaces the gaging rollers may be plain cylindrical or conical rollers.

Stop means of any desired form is provided in order to limit the extent of pivotal movement of the multiple head at least in one direction. The construction illustrated in Figures 1 and 2 includes a stop flat carried by the multiple roller head for each pair of holes in the head or mounting means and gaging rollers. For example for No. 5 the stop flat 40 is used, 41 is for No. 6, 42 for No. 8, 43 for No. 10 and 44 for No. 12 position or pair of gaging rollers.

The stop means also includes a projection 47 carried by the frame post 11 in which is received a stop screw 48 which may be locked in position by a lock screw 49. This stop screw is located off center from the head stud 23 which enables the head 24 with its gaging rollers 36 to swing far enough away from the cooperating gaging roller 17 for the insertion and removal of a test part T to and from gaging position such as represented by a line extending through the center of the bearing 16 and the head stud 23. The stop flat happens to be located at right angles to a line through the centers of the holes 29 and 33. It is clear however that the flat for position No. 5 and the other positions may be otherwise located angularly with respect to the roller centers and the position of the stop screw 48 located to engage the stop flat intended for this position. A similar stop flat 41, 42, 43 and 44 is provided for each pair of gaging rollers or mounting holes in the head.

In Figure 3 a stop means is illustrated which limits rotation in one direction only. It is viewed as though taken on line 3—3 of Figure 1. This means includes a stop flat in the form of a stop shoulder means for each position and includes shoulders 52, 53, 54, 55 and 56 for the five roller head illustrated. This shoulder means is a ratchet wheel or multiple stop element in form secured to or integral with the head and takes the place of the stop means formed by the stop flats 40, 41, 42, 43, 44 respectively. A stop pawl 57 pivoted on a pin 58 is carried by the frame post 11 and a spring 59 presses the pawl against the ratchet wheel. With this form of stop means the head can turn a complete circle or more in one direction, that is, counterclockwise as shown in Figures 2 and 3 but the shoulder limits movement in the other direction to gaging position for the respective pair of gaging rollers. It is immaterial which part, namely the ratchet wheel or pawl, is carried by the frame and the other is then carried by the head. The part carried by the rotatable head is the movable element of the stop means.

For the indicating type of gage shown, the movement of the post 12 and hence of the gaging roller 17 is shown by a dial type indicator, carried by a post 62 which is an integral part of the frame 10. The operating or contact button 63 may be located above the center of the pivot 21 by a distance of two units where the distance to the center of the roller 17 is three units. This provides a 1:1 reading taking into consideration that with three gaging rollers angularly spaced, a diameter is not measured.

The gage particularly shown is of the indicating type, that is the cooperating gaging means is mounted for movement, a pivotal movement being shown, and an indicator indicates the relative acceptability of the test part with respect to a master thread or part. The invention is applicable to a go and not go type of gage in which the cooperating gaging means is not movable or fixed. The rollers shown are ridged for screw threads; however, for plain cylindrical or conical surfaces the gaging rollers may be plain surfaced rollers.

This invention is presented to fill a need for improvements in a multiple roller head and gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage to test the diameter of a test part comprising a gage frame, pivot means carried by the gage frame, a multiple roller head having a pivot bearing to receive the pivot means, the multiple roller head having at least three mounting holes for gaging roller mounting means disposed circumferentially around the pivot bearing with their axes parallel to the pivot bearing axis and equidistant from the center of the pivot bearing, the centers of adjacent mounting holes being spaced different distances from each other and the distance corresponding approximately with the sum of the radius of the test part and the radius of the gaging roller multiplied by the square root of 3, gaging roller mounting means carried by at least two adjacent mounting holes, a gaging roller carried by at least two adjacent gaging roller mounting means to form a pair of spaced gaging rollers, cooperating gaging means carried by the gage frame and positioned to cooperate with the pair of spaced gaging rollers, and stop means carried by the gage frame and by the multiple roller head which permits pivotal movement of the head and limits its movement at least in one direction to gaging position for the pair of gaging rollers.

2. A gage as in claim 1 in which the stop means includes a flat for each pair of mounting holes and carried by the multiple roller head, and means carried by the frame engaging the flat in at least one direction of rotation of the head.

3. A gage as in claim 1 in which the stop means includes a flat for each pair of mounting holes and carried by the multiple roller head, and a stop screw carried by the frame off center from the head pivot means to limit the pivotal movement of the head to gaging position.

4. A gage as in claim 1 in which the stop means includes a multiple stop means carried by one of the parts of the head and the frame, and a pawl engaging the multiple stop means and carried by the other part.

5. A gage as in claim 1 in which the stop means includes a ratchet wheel carried by the multiple roller head and having a stop shoulder for each mounting hole, and rotatable with the multiple roller head and a pawl carried by the frame and engaging the ratchet wheel to limit the movement in one direction to gaging position.

6. A multiple roller head for a gage to test the diameter of a test part comprising a roller frame having a pivot bearing, the multiple roller head having at least three mounting holes for gaging roller studs disposed around the pivot bearing with their axes parallel to the pivot bearing axis and equidistant from the center of the pivot bearing whereby gaging rollers carried thereby form pairs of spaced gaging rollers, adjacent mounting holes being spaced different distances from each other and the distance corresponding approximately with the sum of the radius of the test part and the radius of the gaging roller multiplied by the square root of 3, and a portion of stop means carried by the roller frame.

7. A multiple roller head as in claim 6 in which the portion of the stop means includes a flat carried by the roller frame for each pair of mounting holes extending at right angles to a line projected between the centers of the pair of mounting holes.

8. A multiple roller head as in claim 6 in which the portion of the stop means is one of a ratchet pawl and a ratchet shoulder.

9. A multiple roller head as in claim 6 in which the portion of the stop means is a ratchet pawl.

10. A multiple roller head as in claim 6 in which the portion of the stop means is a ratchet shoulder.

11. A multiple roller head as in claim 6 including gaging roller mounting means secured at each hole.

12. A multiple roller head as in claim 11 including a gaging roller carried by each of at least two mounting means.

PAUL W. JOHNSON.

References Cited in the file of this patent

UNITED STATES PATENTS

| Number | Name | Date |
|---|---|---|
| 2,087,666 | Halt | July 20, 1937 |
| 2,387,218 | Troedson | Oct. 16, 1945 |
| 2,499,418 | Rinaldy | Mar. 7, 1950 |

FOREIGN PATENTS

| Number | Country | Date |
|---|---|---|
| 596,970 | Great Britain | Jan. 15, 1948 |